US012050058B2

(12) United States Patent
Schulakow-Klass

(10) Patent No.: US 12,050,058 B2
(45) Date of Patent: Jul. 30, 2024

(54) INDURATION MACHINE

(71) Applicants: PAUL WURTH S.A., Luxembourg (LU); PAUL WURTH DEUTSCHLAND GMBH, Wiesbaden (DE)

(72) Inventor: Andrej Schulakow-Klass, Wiesbaden (DE)

(73) Assignees: PAUL WURTH S.A., Luxembourg (LU); PAUL WURTH DEUTSCHLAND GMBH, Wiesbaden (DE)

( * ) Notice: Subject to any disclaimer, the term of this patent is extended or adjusted under 35 U.S.C. 154(b) by 631 days.

(21) Appl. No.: 17/312,245

(22) PCT Filed: Dec. 6, 2019

(86) PCT No.: PCT/EP2019/083986
§ 371 (c)(1),
(2) Date: Jun. 9, 2021

(87) PCT Pub. No.: WO2020/120318
PCT Pub. Date: Jun. 18, 2020

(65) Prior Publication Data

US 2022/0026149 A1 Jan. 27, 2022

(30) Foreign Application Priority Data

Dec. 11, 2018 (EP) .................................... 18211746

(51) Int. Cl.
*F27B 21/06* (2006.01)
*C22B 1/24* (2006.01)
(Continued)

(52) U.S. Cl.
CPC ............ *F27B 21/06* (2013.01); *C22B 1/2413* (2013.01); *F27B 9/12* (2013.01); *F27D 17/002* (2013.01); *F27D 17/008* (2013.01); *F27B 2009/122* (2013.01); *F27D 2201/00* (2013.01)

(58) Field of Classification Search
None
See application file for complete search history.

(56) References Cited

U.S. PATENT DOCUMENTS 3,288,449 A 11/1966 Linney
4,120,645 A 10/1978 Heian et al.
(Continued)

FOREIGN PATENT DOCUMENTS

FR 2529577 A1 1/1984
GB 1072421 A 6/1967
GB 1439488 A 6/1976

OTHER PUBLICATIONS

International Search Report issued Feb. 6, 2020 re: Application No. PCT/EP2019/083986, pp. 1-5, citing: US 2010/0242684 A1, US 4 120 645 A, GB 1 439 488 A, US 3 288 449 A, US 2012/0124856 A1, GB 1 072 421 A and US 4 194 729 A.
(Continued)

*Primary Examiner* — Anthony M Liang
(74) *Attorney, Agent, or Firm* — CANTOR COLBURN LLP

(57) ABSTRACT

An induration machine includes a travelling grate for transporting bulk material along a transport direction from a heating zone for heating and/or drying the material to a cooling zone for cooling the material by cooling gas. The machine includes a hood disposed over the travelling grate having a first hood section in the heating zone and a second hood section in the cooling zone; and two recuperation ducts for guiding used cooling gas from the second hood section to the first hood section.
(Continued)

The recuperation ducts are disposed on opposite sides of the hood, are laterally offset with respect to the hood, and are connected to the second hood section by a V-shaped gas collector duct. Each recuperation duct is connected to the first hood section by at least one gas supply duct and has at least one dust purge opening disposed in the lowermost part of the recuperation duct for purging dust from the recuperation duct.

13 Claims, 7 Drawing Sheets

(51) Int. Cl.

| | |
|---|---|
| ***F27B 9/12*** | (2006.01) |
| ***F27D 17/00*** | (2006.01) |

(56) References Cited

U.S. PATENT DOCUMENTS

| | | | |
|---|---|---|---|
| 4,194,729 | A | 3/1980 | Feigk et al. |
| 2010/0242684 | A1 | 9/2010 | Stiasny et al. |
| 2012/0124856 | A1 | 5/2012 | Palander |

OTHER PUBLICATIONS

Written Opinion issued Feb. 6, 2020 re: Application No. PCT/EP2019/083986, pp. 1-6, citing: US 2010/0242684 A1, US 4 120 645 A and GB 1 439 488 A.

Eurasian Office Action issued Jul. 18, 2022 re: Application No. 202191591, pp. 1-4, citing: FR 2529577 A1 .

INDURATION MACHINE

TECHNICAL FIELD

The disclosure relates to an induration machine with a hood, also referred to as PhilAnt hood.

BACKGROUND

In iron metallurgy, induration machines are commonly used to agglomerate fine particles of a bulk material by a pelletizing and/or drying process. The initially particulate material is thermally treated as it is conveyed on a travelling grate. The travelling grate, which may be used in drying or pelletizing machines, is realised by an endless chain of pallet cars (or grate carriages) which move along rails. The pallet cars are filled with the bulk material and pass through the pellet firing or drying machine, in which they are thermally treated.

In order to perform a thermal treatment of the bulk material, the induration machine in pelletizing has a process line with several treatment zones with different temperature regimes. For example, there may be one or more drying zones which are followed by a pre-heating zone and a firing zone, the latter being largely responsible for the pelletizing process. Afterwards, the travelling grate usually passes through one or more cooling zones, where active cooling is normally performed by passing a cooling gas stream through the bulk material. Likewise, it is common to pass a gas stream (e.g. consisting of air or another process gas) through the bulk material in the drying, pre-heating and/or firing zone. The gas stream may serve to allow for more effective drying or heating or to provide sufficient oxygen supply for the combustion of a (solid, liquid or gaseous) heating fuel.

In order to properly direct the gas streams through the bulk material and to seal the different zones against each other and against the outside atmosphere, a series of wind boxes are provided under the travelling grate and a hood is provided above the travelling grate. The wind boxes and the hood are connected in a (more or less) gas-tight manner with the travelling grate. Normally, there is at least one wind box for each of the above-mentioned zones and the hood is divided into different sections which correspond to the zones. Each of the wind boxes and each of the sections of the hood can be connected to at least one duct or channel for either introducing or removing gas. The gas flow through such a channel is normally enhanced by one or several fans.

In order to more effectively heat the material in the pre-heating or firing zone and to save energy, it is common to connect at least one of these zones with a cooling zone by a recuperation duct, through which used cooling gas (having a temperature of e.g. about 400° C.) is guided into the pre-heating or firing zone. According to one design known in the art, the recuperation duct is either integrated into an uppermost part of the hood or is disposed above the hood. The gas is introduced into the firing zone through one or more connection ducts. Often, these ducts comprise a combustion chamber with horizontal burners where the gas is heated from its already elevated temperature to the necessary temperature for performing the drying or pelletizing process, respectively. Most of the chambers and ducts are protected by a refractory inner lining for thermal isolation and in order to withstand the elevated temperatures for an extended time period.

A serious issue of induration machines known in the art is the length and frequency of shutdown times that are necessary due to damages of the refractory material. Many of these damages are not caused by the elevated temperatures as such. Rather, dust, which is carried by the gas stream into the recuperation duct and further into the combustion chamber, is accumulated and melted or dried by the elevated temperatures to form slag which partially adheres to the refractory lining. As the slag undergoes temperature changes leading to expansion and contraction, the coincident forces on the refractory material cause damages. This necessitates a cold shutdown of the induration machine in order to remove the slag and repair the refractory lining. This is a rather time-consuming process which leads to additional costs and decreases the productivity of the plant.

The present disclosure therefore reduces the overall shutdown time of an induration machine. This is solved by providing an induration machine according to claim 1.

SUMMARY

The disclosure provides an induration machine with a new design of an induration hood, also referred to as PhilAnt hood. The machine comprises a travelling grate for transporting bulk material along a transport direction from a heating zone for heating the material to a cooling zone for cooling the material by cooling gas. In the following, the transport direction as well as the opposite direction are also referred to as the "longitudinal" direction. The travelling grate of course comprises an endless chain of pallet cars which move along rails. In the induration machine, iron ore pellets are dried and/or fired by exposing them to an appropriately high temperature. In this case, the bulk material comprises "green" iron ore pellets. In general, the travelling grate runs along a transport direction along at least two different zones, namely the heating zone and the cooling zone. Generally speaking, the heating zone is a zone in which heat is transferred to the bulk material. This may refer to a drying zone (having moderately high temperatures of e.g. 300° C. to 400° C.), but usually it refers to a pre-heating or firing zone (having high temperatures e.g. between 900° C. and 1400° C.). It is understood that the heating zone does not have to be the first zone along the transport direction and that there may also be at least one additional zone between the heating zone and the cooling zone. Either way, the bulk material is transported from the heating zone to the cooling zone, where it is cooled by cooling gas. In this context, "cooling gas" normally refers to ordinary air, but in a wider sense refers to any gas or mixture of gases that is used for cooling the bulk material. Normally, the cooling gas is at about ambient temperature before it comes into contact with the bulk material, but afterwards may have a temperature of several hundred degrees Celsius. Preferably, the cooling gas is applied as a rising gas stream that flows through the bulk material.

The induration machine further comprises a hood disposed over the travelling grate having a first hood section in the heating zone and a second hood section in the cooling zone. Usually, the first and second hood sections are connected either directly or by another intermediate section of the hood. Normally, the hood covers at least a larger part of the travelling grate from above in a more or less gas-tight manner. Also, different zones having different temperatures are normally separated by separating walls or curtains which at least minimize any gas exchange. Accordingly, even if the first and second hood sections are directly connected with each other, their inside volumes are normally separated against gas exchange. The width of the hood usually corresponds more or less to the width of the travelling grate itself. In order to withstand the elevated temperatures inside, the hood may have an outer layer made of metal and an inner layer made of refractory material, which may also be referred to as a refractory lining.

The induration machine further comprises two recuperation ducts for guiding used cooling gas from the second hood section to the first hood section. "Used cooling gas" is of course cooling gas that has already been used for cooling the bulk material and therefore has an elevated temperature. Its relatively high energy content is used to facilitate or enhance heating of the bulk material in the heating zone. It is understood that apart from the two recuperation ducts, the heating zone may be connected to other sources of gas. The recuperation ducts normally have an outer layer of metal and may also comprise a refractory lining. The same applies to other ducts which are described below.

The induration machine comprises two recuperation ducts disposed on opposite sides of the PhilAnt hood. Each of these recuperation ducts is laterally offset with respect to the hood, so that one recuperation duct is "on the left side" and the other is "on the right side". Recuperation ducts are connected to the second hood section by a V-shaped gas collector duct and to the first hood section by at least one gas supply duct and has a plurality of dust purge openings disposed in a lower region for purging dust from the recuperation duct. As viewed from above, the gas collector duct has a V-shape or forked shape with one half supplying one of the recuperation ducts while the other is supplying the other recuperation duct.

Each recuperation duct is laterally offset, which means that it is offset along a horizontal direction perpendicular to the transport direction. "Horizontal" and "vertical" in this context refers to the direction of gravity when the induration machine is in its operational state. In other words, at least a part of the recuperation duct is not disposed horizontally above the hood. The vertical position of the recuperation duct with respect to the hood can be chosen to be higher, equal to or lower than the vertical position of the hood. The recuperation ducts are connected to the second hood section by a V-shaped gas collector duct. The gas collector duct, through which used cooling gas flows from the second hood section into the recuperation duct, may also comprise a refractory lining. Further, the recuperation duct is connected to the first hood section by at least one gas supply duct, normally by a plurality of gas supply ducts. These gas supply ducts are used to supply or introduce gas originating from the second hood section into the first hood section. Normally, each gas supply duct has a refractory lining.

While the recuperation ducts are used for guiding gas and therefore have a largely gas-tight outer shell, each recuperation duct has at least one, normally a plurality of dust purge openings disposed in a lower region. In the context of the disclosure, this lower region of the recuperation duct describes in particular the lowermost part, i.e. the "bottom" of the recuperation duct. As dust is carried by the gas stream into the recuperation duct, most of this dust sooner or later settles at least temporarily in the lower region. Due to the presence of the dust purge opening(s), any dust entering the opening is purged from the recuperation duct, normally by force of gravity. Each purge opening leads to a space outside of the recuperation duct, the hood, the gas supply duct and the gas collector duct. While some gas may also exit the recuperation duct through the respective purge opening, this amount can be kept small or even negligible compared to the total amount of gas flowing through the recuperation duct. A path through the dust purge opening to the outside of the recuperation duct may be closable by a valve, e.g. a double pendulum flap valve or a double cone valve, in order to avoid unnecessary gas leakage. Such a valve may e.g. be disposed within or below the dust purge opening, e.g. in a purge duct (see also below) to which it is connected. The cross-sectional area of the individual purge opening may be rather small, e.g. between 1% and 5% of the (inner) cross-sectional area of the recuperation duct, but may also be larger. By the presence of the dust purge openings, accumulation of dust inside the recuperation duct and the gas supply duct(s) is prevented or at least considerably reduced. The same applies for the formation of slag, wherefore damages to the refractory lining caused by expansion and contraction of slag are also reduced. Therefore, the overall shutdown time can be decreased and the total operational time is improved.

In this context, the gas supply duct and the gas collector duct may be considered as part of the recuperation duct and it is therefore conceivable that at least one dust purge opening is disposed in a gas supply duct or a gas collector duct.

Preferably, the induration machine comprises means for collecting dust purged from the recuperation duct. Such means may be vessels that are positioned stationarily to collect dust exiting the recuperation duct through the purge opening. E.g. when the individual vessel is full, it may be replaced by an empty vessel or emptied while remaining in position. Such means for collecting dust could also comprise a conveying device, a conveyor belt or the like, which collects the dust and transports it to a desired location. Usually, the dust can be reused, for example in order to form new pellets or other recycling methods like briquettes or others. Thus, the re-introduction of the dust into the process line may be carried out automatically or at least partially automatically.

While it is possible that each purge opening is directly connected to the outside, it is preferred that a purge duct is connected to each purge opening. In order to facilitate gravitational movement of the dust, it is preferred that the purge duct extends downwards, in particular vertically. A lower end of the purge duct may be positioned above or inside the above-mentioned means for collecting dust, which reduces the risk of dust polluting the surroundings of the induration machine.

While the means for heating the material in the heating zone are generally not restricted within the scope of the disclosure, it is preferred that the induration machine comprises a plurality of burners for heating the material in the heating zone, which burners are directed downwards. These burners can be adapted to burn any kind of gaseous, liquid or even solid fuel (e.g. coal). "Directed downwards" means that each burner is adapted to produce a flame that has downward movement component. This embodiment may avoid problems associated with horizontally directed burners, like overheating of the refractory lining or bending of the burners under the influence of heat and gravitation. Also, downwards directed burners may lead to an improved heat distribution over the pellet bed and may avoid the necessity of redirecting the burner flame. It may be noted that these are the major root causes for actually damaging the refractory in state-of-the-art firing hoods and downcomers (burner pots), According to one embodiment, at least some burners are directed vertically downwards. Alternatively or additionally, at least some burners are directed obliquely to the vertical direction. If the burners are directed obliquely, they may be inclined towards a direction of an intended gas flow in order to support this gas flow.

At least some burners can be disposed in the second hood section. In this case, these burners are normally mounted to the ceiling, i.e. the uppermost part of the second hood section. They may be directed vertically downwards and/or they may be longitudinally inclined. Alternatively or additionally, at least some burners can be disposed in at least one gas supply duct. The latter option corresponds rather to an indirect heating of the bulk material, while the first option may comprise a direct heating, where the flames of the burners are directed onto the bulk material itself. The burners in the gas supply duct are normally at least laterally inclined (in order to support a gas flow towards the hood) but may additionally also be longitudinally. Furthermore, at least one burner may be disposed in the V-shaped gas collector duct. This at least one burner may also be longitudinally inclined and, optionally, laterally inclined. A burner in the gas collector duct may mostly be employed during a warm-up period of the induration machine after a cold start and may be turned off during normal operation. Also, at least some burners may be disposed in at least one recuperation duct. These burners may also be mostly employed during a warm-up period. The burners can be installed in different pattern arrangements in defined areas to ensure specific energy input. With different patterns and burner control, a harmonized temperature profile can be achieved over the material bed.

Since each recuperation duct is laterally offset (and optionally vertically offset) with respect to the hood, it is possible to align the gas supply ducts perpendicularly with respect to the transport direction. Depending for example on the vertical position of the recuperation duct, each gas supply duct may be aligned horizontally or in a sloped manner. However, in order to facilitate and enhance the gas flow from the second hood section to the first hood section, it may be advantageous if least one gas supply duct is aligned obliquely to the transport direction. In particular, starting from the second hood section, the respective gas supply duct may be inclined in the direction where the first hood section is located, which is the general intended direction of the gas flow. "Aligned obliquely" includes embodiments where the gas supply duct is straight as well as embodiments where the gas supply duct is bent or curved.

Likewise, the V-shaped gas collector duct may be aligned obliquely to the transport direction.

According to one embodiment, the supply ducts of the two recuperation ducts are disposed separately from each other and can be connected to opposite sides of the first hood section. This embodiment may be employed in particular if the vertical position of the recuperation ducts corresponds largely to that of the hood. According to another embodiment, least one gas supply duct is a T-connection between the recuperation ducts and the first hood section. In other words, the "arms of the T" are connected to the recuperation ducts, while the "base of the T" is connected to the first hood section.

As mentioned above, each recuperation duct is preferably connected to the first hood section by a plurality of gas supply ducts. These gas supply ducts are normally disposed sequentially along the transport direction. This means that the total gas stream initially running through the recuperation duct is divided into partial gas streams running through the individual gas supply ducts. This also means that the flowrate running through the recuperation duct decreases as gas is diverted through each as supply duct. If the cross-section (i.e. the cross-sectional area) of the recuperation duct is constant over its entire length, this would lead to considerable differences in the gas velocity. In order to avoid this, it is preferred that a cross-section of at least one recuperation duct increases towards the V-shaped gas collector duct. Normally, the cross-section increases in stages, so that the recuperation duct may comprise e.g. a first section with a small cross-section, a second section with an intermediate cross-section and a third section with a large cross-section. Additionally, the gas supply ducts can have an optimized aerodynamical design.

Since each recuperation duct is laterally offset with respect to the hood, it is possible to individually access either part of the induration machine selectively from above. Also, as mentioned above, the recuperation duct may be disposed in a vertical position similar to that of the hood, i.e. the recuperation duct and the hood may be approximately at the same vertical position. These circumstances can be utilised to facilitate construction and maintenance. In a preferred embodiment, the induration machine comprises a hoist which is positionable above the hood and above each recuperation duct. The hoist (e.g. a crane), which may be provided with a system of horizontal running hoist beams to allow repositioning, can be used to selectively access the hood or the at least one recuperation duct from above. In particular, such a hoist may be permanently disposed within a building of the induration machine.

To further facilitate construction and maintenance, it is preferred that at least one recuperation duct comprises a plurality of successive duct segments along its length, which are arranged for individual exchange. These duct segments may be pre-manufactured including a refractory lining and can then be installed and connected with each other at the location of the induration machine. The duct segments can be moved into or out of position by a hoist as described above. It is understood that using such duct segments decreases the time for construction and the shutdown time needed for maintenance. The duct segments are arranged for individual exchange, which means that it is possible to remove and replace one duct segment without removing the neighbouring duct segments. At least some of the duct segments may be identical, which also helps to facilitate initial construction or exchange of the duct segments. According to one example, the duct segments may be tube sections of a certain length and having a circular cross-section. Additionally or alternatively, at least one gas supply duct and/or the gas collector duct may comprise a plurality of successive elements along its length, which are arranged for individual exchange.

Sometimes it is desirable to have quick access to the inside of the recuperation duct. This may be the case if a rapid cooling of the inside of the recuperation duct is required or if an inspection of the inside needs to be performed. In such a situation, it may be too time-consuming to take out one of the longitudinally successive duct segments. This can be taken into account by an embodiment where at least one recuperation duct comprises two duct segments arranged for transversal separation. These duct segments may also be referred to as half tubes or generally part tubes. In particular, one of the duct segments may be disposed over the other and this upper duct segment can be removed individually. The direction of the separation is transversal to the direction in which the recuperation duct extends. In particular, this may be a vertical direction, so that one element can be lifted from another element.

Similar to the recuperation duct, the hood can comprise a plurality of hood segments arranged for individual exchange. This may in particular referred to the first hood section, which is subjected to the more extreme temperature conditions of the heating zone and is therefore more likely to need maintenance or repair. Here too, each hood segment may be pre-manufactured including a refractory lining.

During the construction, the individual hood segments are connected in such a way that it is possible to remove and replace one hood segment without moving the neighbouring hood segments.

For several reasons it may be desirable to influence the gas stream within the recuperation duct or the gas supply ducts. For example, the performance of the induration machine during operation may be influenced if one part of the heating zone is supplied with more or less used cooling gas from the cooling zone. It is even conceivable to completely block the gas flow in and out of a certain part of the system in order to perform inspection or maintenance while the other parts of the induration machine are still in operation. For any of these purposes it is preferred that at least one recuperation duct and/or at least one gas supply duct comprises a valve element for influencing a gas flow.

BRIEF DESCRIPTION OF THE DRAWINGS

The disclosure will now be described, by way of example, with reference to the accompanying drawings, in which.

DETAILED DESCRIPTION OF THE DRAWINGS

Figure 1:
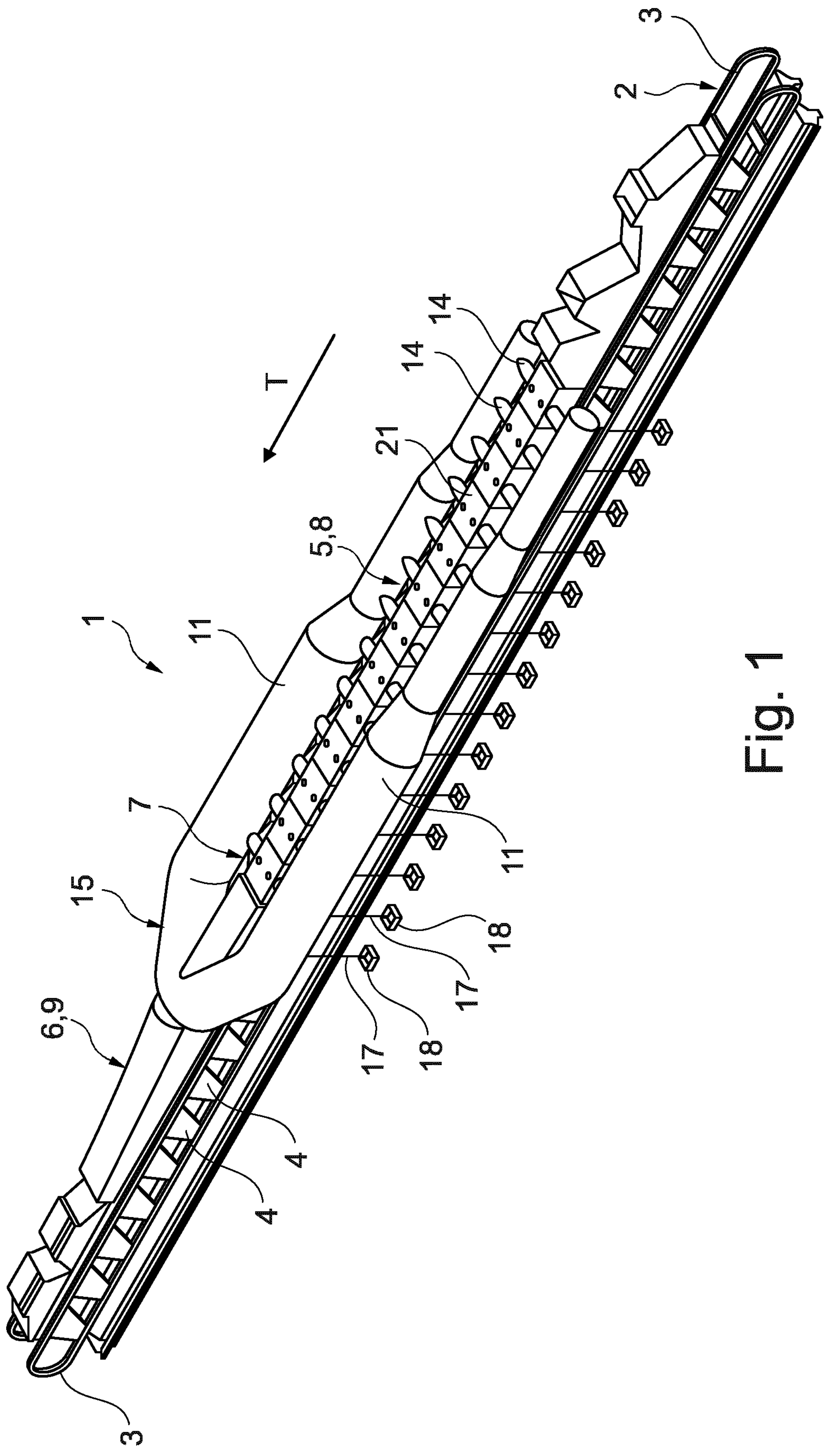
FIG. 1 is a perspective view of an induration machine with a PhilAnt hood according to a first embodiment of the disclosure.
Figure 2:
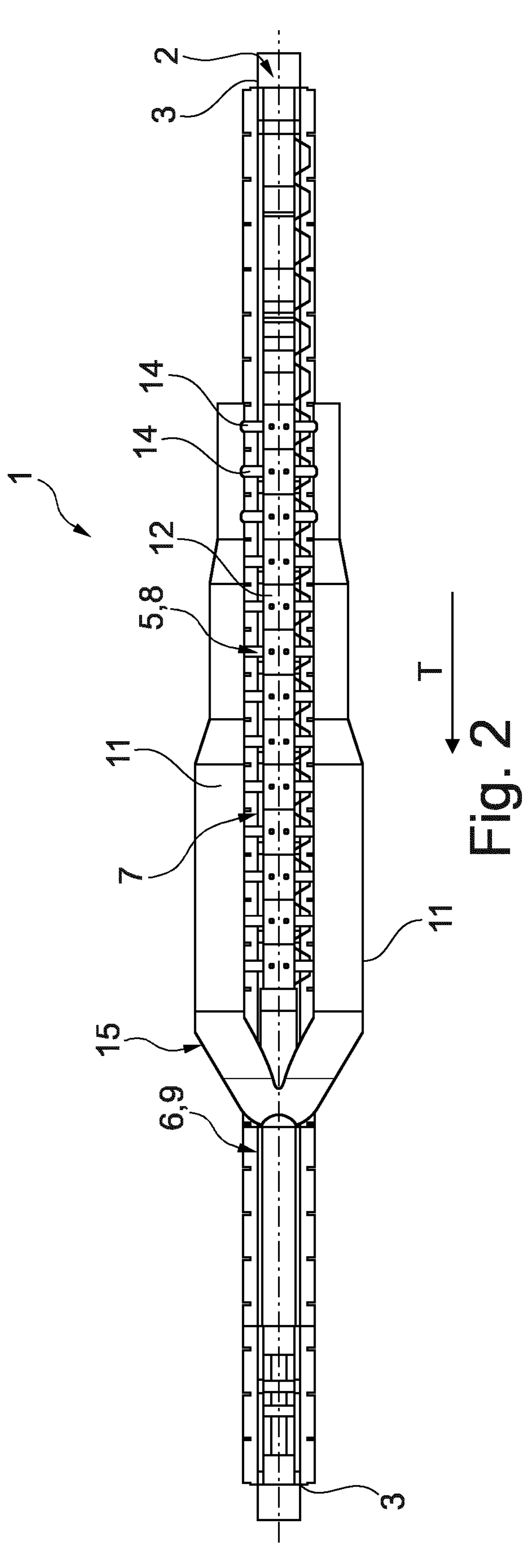
FIG. 2 is a top view of the induration machine from FIG. 1.
Figure 3:
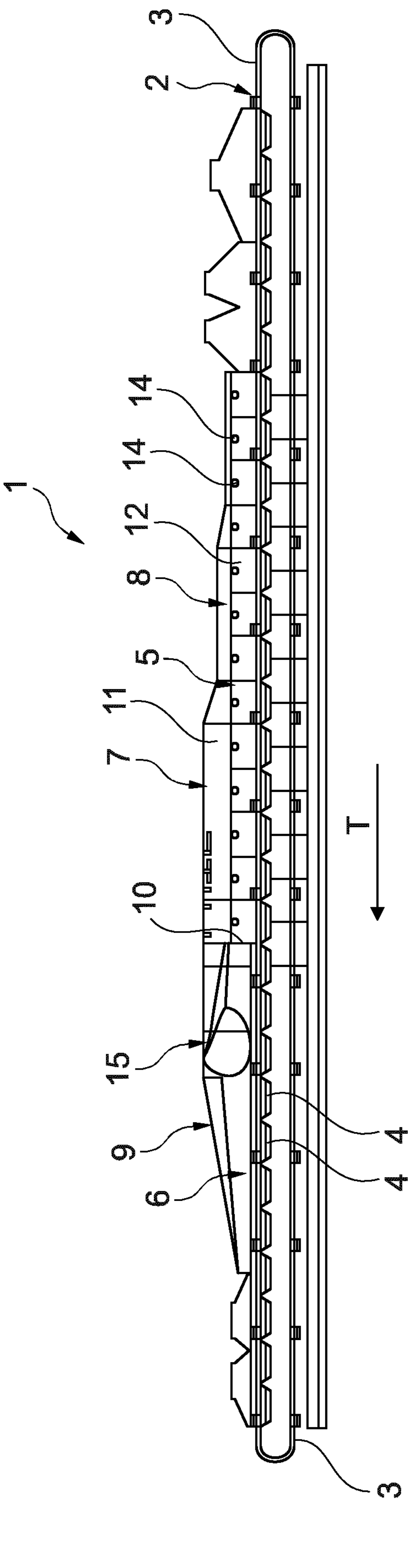
FIG. 3 is a sectional side view of the induration machine from FIG. 1.

FIGS. 1-4 show an induration machine 1 according to a first embodiment of the disclosure. The induration machine comprises two rails 3 of a travelling grate 2, on which a plurality of pallet cars 22 form an endless travelling grate chain. Underneath an upper run of the travelling grate 2, a plurality of wind boxes 4 are disposed, which are connected to the pallet cars in a gas-tight way. A hood 7 is disposed above the travelling grate 2 which forms a at least largely gas-tight seal above the travelling grate 2. The travelling grate 2 is adapted to transport iron ore pellets along a sequence of zones of the induration machine 1 and in particular from a firing zone 5, where drying of the green pellets is performed, along a transport direction T to a cooling zone 6. The drying process is performed under a first hood section 8 of the hood 7. In the cooling zone 6, dried pellets are cooled by an uprising gas stream which is introduced through the wind boxes 4, passes through the travelling grate 2 and enters the hood 7, or more specifically, a second hood section 9. As indicated in FIG. 3, the first hood section 8 and the second hood section 9 are separated by a vertically extending sealing wall 10.

Two recuperation ducts 11 are disposed laterally offset with respect to hood 7. As can be seen especially in FIG. 4, each recuperation duct is disposed in a similar vertical position as the hood 7. The recuperation ducts 11 are disposed on opposite sides of the hood 7 and designed symmetrically. Each of them is connected to the first hood section 8 by a plurality of gas supply ducts 14, which are aligned horizontally and transversally to the transport direction T. Furthermore, both recuperation ducts 11 are connected to the second hood section 9 by a V-shaped gas collector duct 15. The function of the recuperation ducts 11 is to guide used cooling gas from the second hood section 9 to the first hood section 8. The respective gas flow can be established or enhanced by fans with which are not shown in the figures.

As a part of the gas flow exits through every gas supply duct 14, the total gas flow through the recuperation duct 11 decreases from the second hood section 9 along the length of the first hood section 8. This is taken into account by reducing the cross-section of the recuperation duct 11 in stages. A first part as a larger diameter, a second part has an intermediate diameter and a third part has a small diameter. Therefore, although the flow rate decreases significantly, the velocity of the gas flow decreases only moderately. Each recuperation duct 11 is tube-shaped with a circular cross-section as can also be seen in FIG. 4.

Apart from the openings towards the gas collector duct 15 and the gas supply ducts 14, it comprises a plurality of purge openings 16 disposed in a lower region 11.1 of the recuperation duct 11. From each purge opening 16 originates a purge duct 17 which extends vertically downwards. A valve 24, e.g. a double pendulum flap valve or a double cone valve, is disposed in each purge duct 17 in order to avoid unnecessary gas leakage through the purge duct 17. The cross-section of each purge duct 17 can be much smaller than the cross-section of the recuperation duct 11 which further helps to reduce the amount of gas that can exit through the purge duct 17. As used cooling gas is guided through the recuperation duct 11, it is laden with a considerable amount of dust, which could settle in the recuperation duct 11 and the gas supply ducts 14. This is largely prevented by the presence of the purge openings 16 through which dust is purged by gravitational pull from the recuperation duct 11. The valves 24 can be opened intermittently to allow dust to fall downwards through the purge duct 17. A box 18 is disposed at the lower end of each purge duct 17 to collect the dust from the recuperation duct 11. Instead of boxes 18 placed underneath the purge ducts 17, a conveyor system could also be used to transport the dust to a desired location. For instance, the dust could be reused in the production of new pellets or other recycling methods like briquettes or others.

Figure 4:
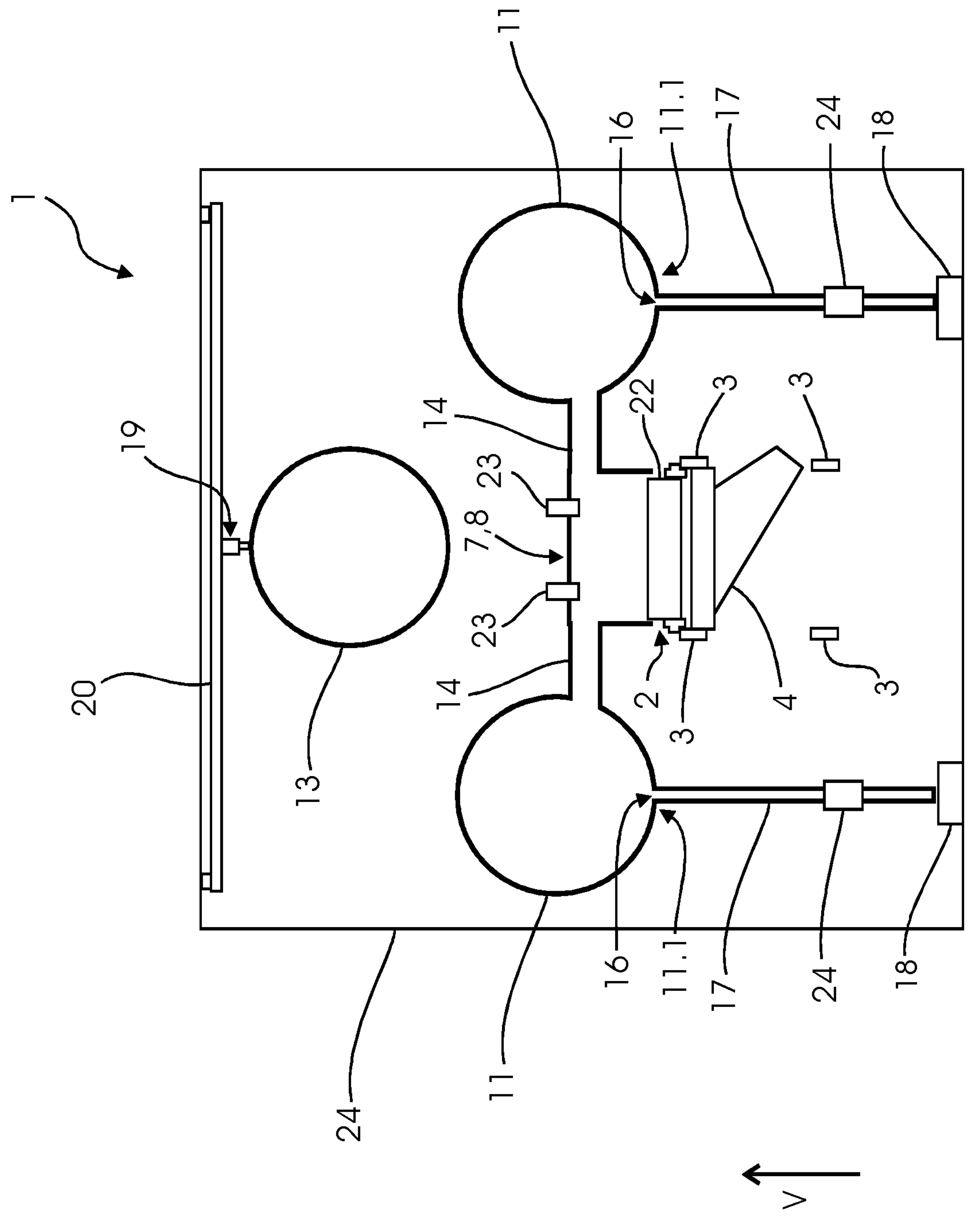
FIG. 4 is a sectional front view of the induration machine from FIG. 1.

As shown in the cross-sectional view of FIG. 4, the hood 7 has a rectangular cross-section in the first hood section 8, while the recuperation ducts 11 have a circular cross-section. Each of these elements has an outer shell made of metal with an inner lining of refractory material. In order to facilitate construction and maintenance of the induration machine 1, both the hood 7 and the recuperation ducts 11 comprises a plurality of duct segments 13 which are arranged for individual exchange. Likewise, the gas supply ducts 14 and the gas collector duct 15 may comprise a plurality of duct segments that are arranged for individual exchange. In other words, it is possible to remove and replace a single duct segment 13 without removing neighbouring duct segments. FIG. 4 shows by way of example a duct segment 13 of a recuperation duct 11 that is being moved by a hoist 19 which is mounted above the hood 7 and the recuperation ducts 11. Since the recuperation ducts 11 are disposed beside the hood 7 at approximately the same vertical position, a hoist beam 20 of the hoist 19 can be positioned at a relatively low height. Therefore, the hoist 19 can easily be placed within a building 24 of the induration machine 1.

In the embodiment shown in FIGS. 1-4, the necessary heat for drying the pellets in the firing zone 5 is generated by a plurality of burners 23 which are mounted to the ceiling of the first hood section 8. The burners 14 are directed vertically downwards.

Figure 5:
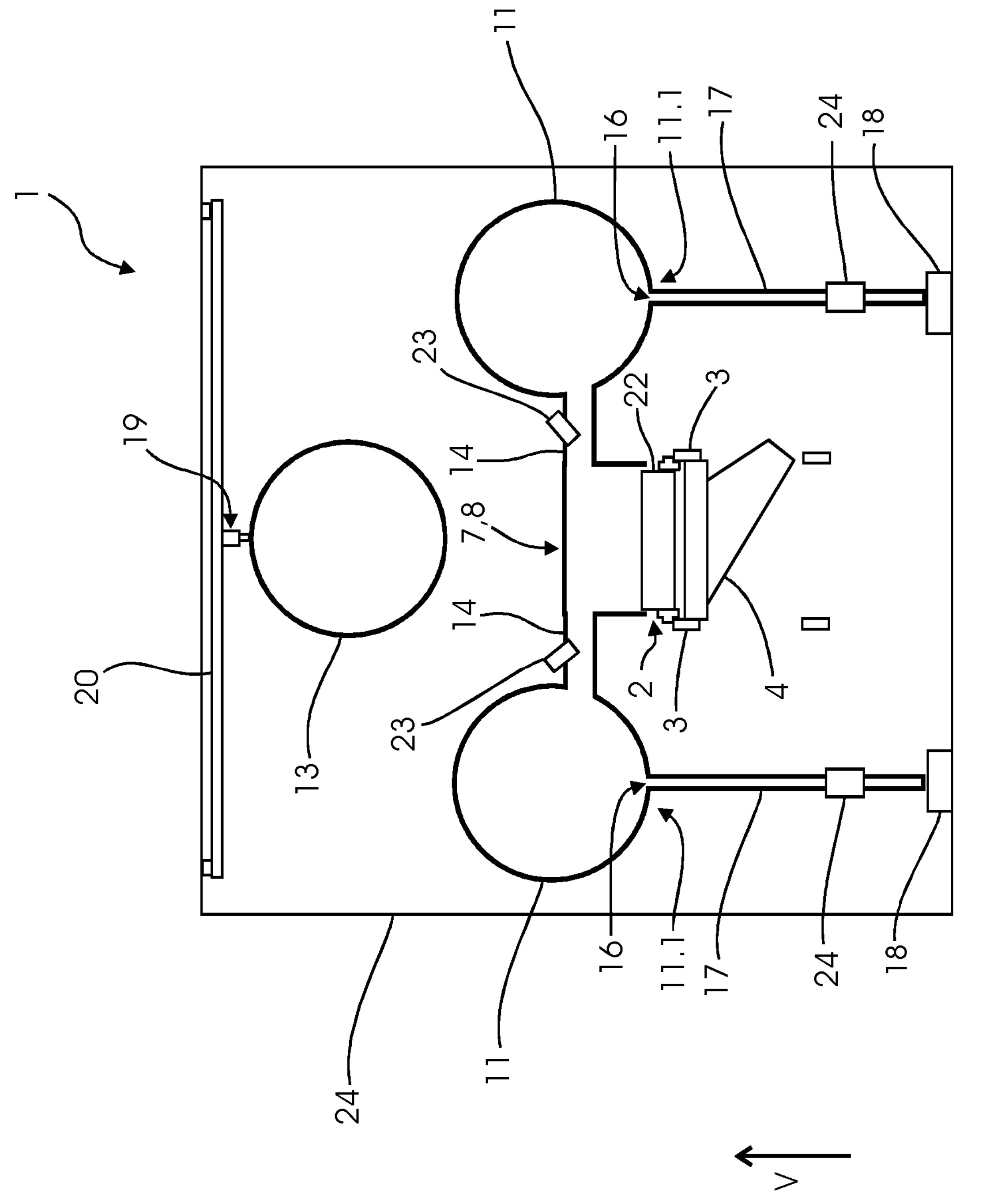
FIG. 5 is a sectional front view of an induration machine according to a second embodiment.

FIG. 5 shows a cross-section front view of a second embodiment of an induration machine 1 which is largely identical to the first embodiment. In this case, however, the burners 23 are mounted to the gas supply ducts 14 and are directed obliquely to the vertical direction V. In particular, they are inclined towards the intended direction of the gas flow, i.e. towards the hood 7. This may help to support or enhance the gas flow. It should be noted that the burners 23 could alternatively be directed vertically downwards while being mounted to the supply ducts 14.

Figure 6:
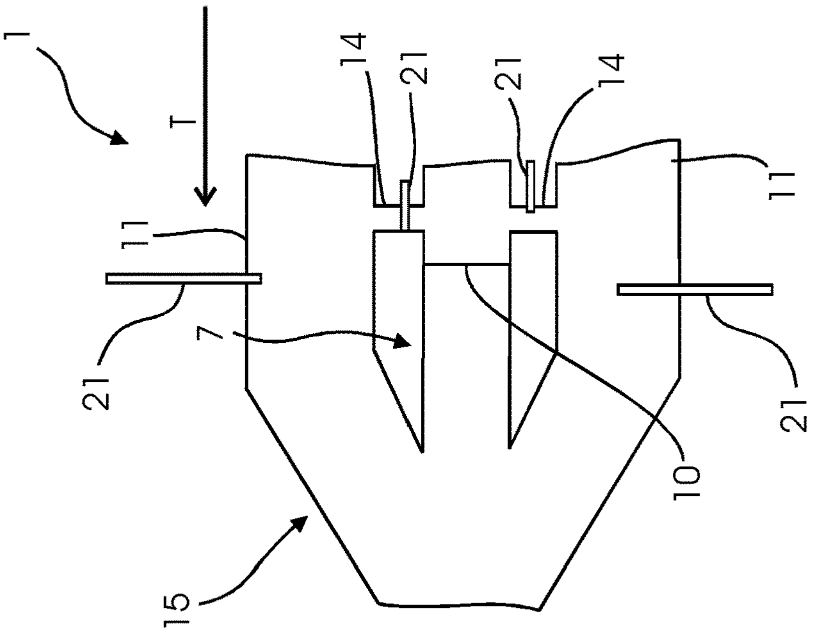
FIG. 6 is a sectional top view of a part of an induration machine according to a third embodiment.

FIG. 6 is a cross-section top view of a part of an induration machine 1 according to a third embodiment, which is largely identical to the first embodiment. In this embodiment, a plurality of movable valve elements 21 are provided in the recuperation duct 11 and the gas supply ducts 14. Using these valve elements, the gas flow can be blocked, reduced or redirected in a desired way.

Figure 7:
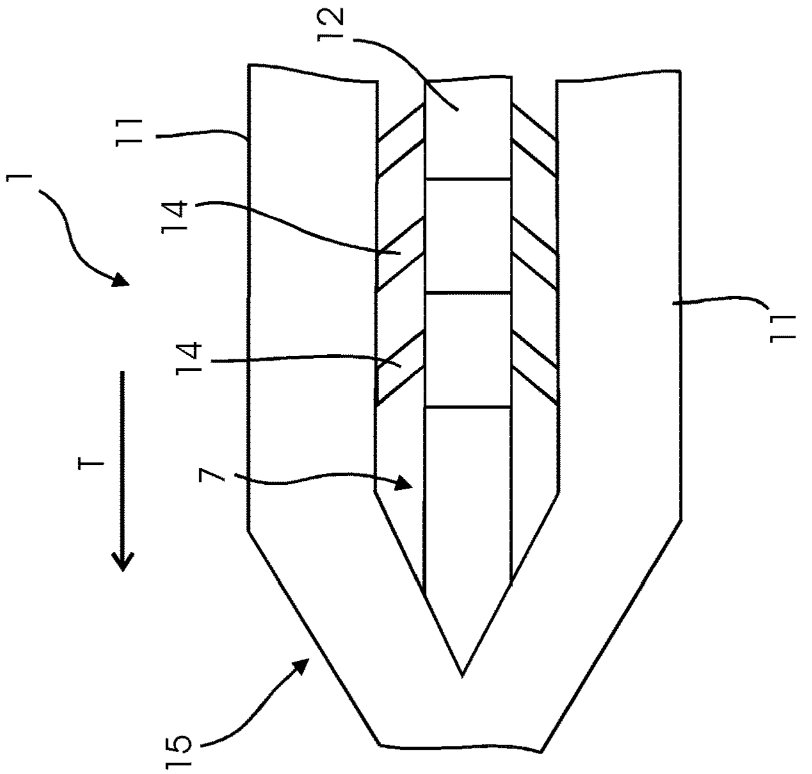
FIG. 7 is a top view of a part of an induration machine according to a fourth embodiment.

FIG. 7 is a cross-sectional top view of a part of an induration machine 1 according to a fourth embodiment, which differs from the first embodiment in that the gas supply ducts 14 are not aligned perpendicularly to the transport direction T, but obliquely. In other words, the gas supply ducts 14 are inclined towards the transport direction T, so that the gas flow from the recuperation duct 11 only has to undergo a minor change of direction as it enters the gas supply duct 14. This can also help to increase the gas flow.

Figure 8:
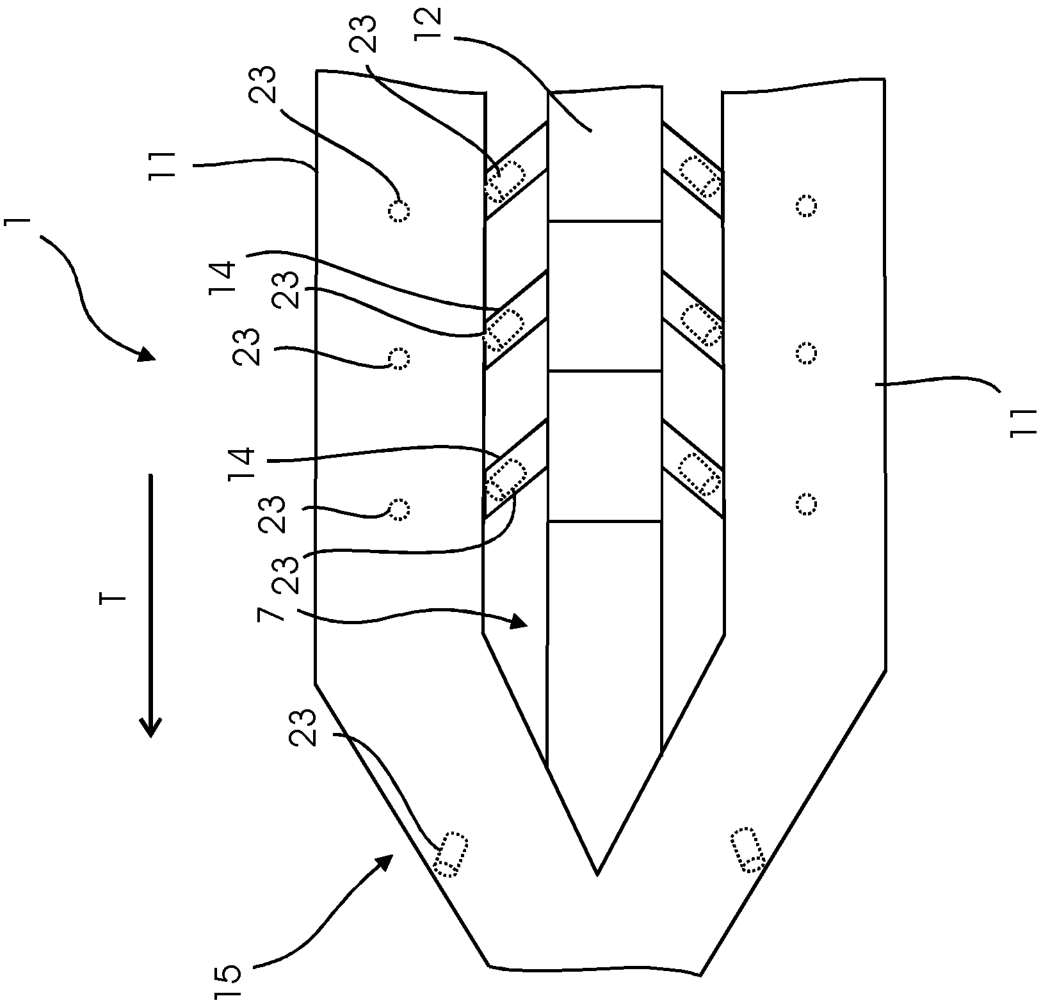
FIG. 8 is a top view of a part of an induration machine according to a fifth embodiment.

FIG. 8 is a cross-sectional top view of a part of an induration machine 1 according to a fifth embodiment, which is largely identical to the fourth embodiment, but has a special configuration of the burners 23. One burner 23 is disposed on either side of the gas collector duct 15. This burner 23 is inclined laterally as well as longitudinally. Furthermore, several vertically aligned burners 23 are disposed in each recuperation duct 11 or hood 7. All of these burners 23 may be turned on only during a warm-up phase after a cold start of the induration machine 1. Furthermore, a plurality of burners 23 are disposed in the gas supply ducts 14. These are also inclined laterally and longitudinally, mostly in order to enhance a gas flow during normal operation of the induration machine. It is understood that the burner configuration shown here can be used with minimal adaption in any of the first, second or third embodiment.

Figure 9:
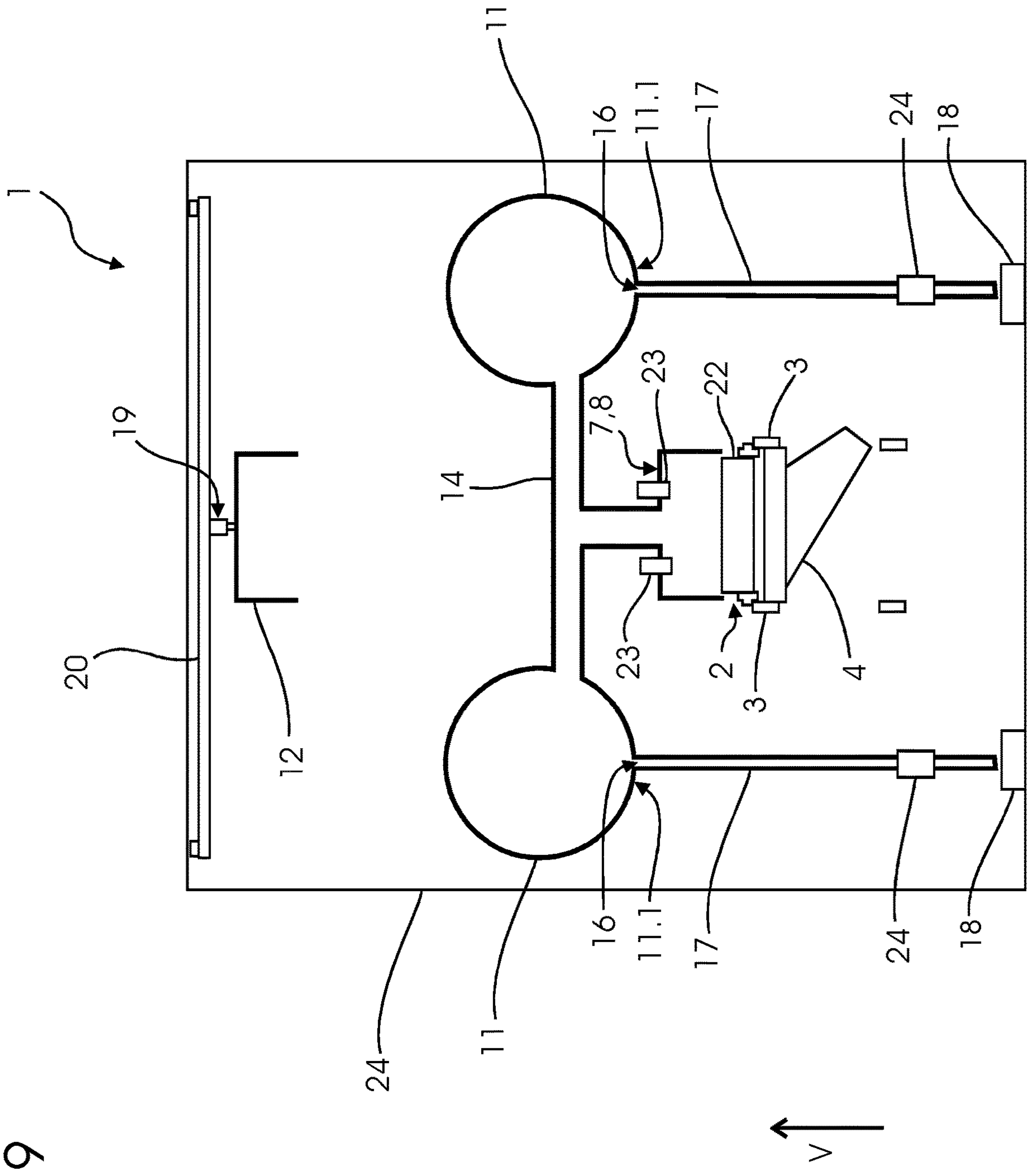
FIG. 9 is a sectional front view of an induration machine according to a sixth embodiment.

FIG. 9 is a cross-sectional front view of an induration machine 1 according to a sixth embodiment. Here, the recuperation ducts 11 are also laterally offset with respect to the hood 7, but are disposed considerably higher than in the first embodiment. Also, the shape of the gas supply ducts 14 is different. In particular, each gas supply duct 14 is a T-junction that connects the recuperation ducts 11 and the hood 7 with each other. Also, by way of example, a hood segment 13 of the hood 7 is shown that is being moved by a hoist 19 which is mounted above the hood 7 and the recuperation ducts 11.

The invention claimed is:

1. An induration machine comprising:

a travelling grate for transporting bulk material along a transport direction from a heating zone for heating and/or drying the material to a cooling zone for cooling the material by cooling gas;

a hood disposed over the travelling grate having a first hood section in the heating zone and a second hood section in the cooling zone; and two recuperation ducts for guiding used cooling gas from the second hood section to the first hood section, wherein the recuperation ducts are disposed on opposite sides of the hood, are laterally offset with respect to the hood, and are connected to the second hood section by a V-shaped gas collector duct and each recuperation duct is connected to the first hood section by at least one gas supply duct and has at least one dust purge opening disposed in a lowermost part of the recuperation duct for purging dust from the recuperation duct.

2. The induration machine according to claim 1, comprising means for collecting dust purged from the each recuperation duct.

3. The induration machine according to claim 1, wherein a purge duct is connected to each purge opening.

4. The induration machine according to claim 1, comprising a plurality of burners for heating the material in the heating zone, wherein the burners are directed downwards.

5. The induration machine according to claim 4, wherein at least one of the burners are directed vertically downwards and/or at least one of the burners are directed obliquely to the vertical direction.

6. The induration machine according to claim 4, wherein at least one of the burners are disposed in the second hood section, at least one of the burners are disposed in at least one gas supply duct and/or at least one of the burners is disposed in the gas collector duct.

7. The induration machine according to claim 1, wherein at least one gas supply duct is aligned obliquely to the transport direction.

8. The induration machine according to claim 1, wherein at least one gas supply duct is a T-connection between the recuperation ducts and the first hood section.

9. The induration machine according to claim 1, wherein a cross-section of at least one recuperation duct increases towards the gas collector duct.

10. The induration machine according to claim 1, wherein at least one recuperation duct comprises a plurality of successive duct segments along its length, which are arranged for individual exchange.

11. The induration machine according to claim 1, wherein the hood comprises a plurality of hood segments arranged for individual exchange.

12. The induration machine according to claim 1, wherein at least one recuperation duct and/or at least one gas supply duct comprises a valve element configured for influencing a gas flow.

13. The induration machine according to claim 1, further comprising a hoist positionable above the hood and above each recuperation duct.

* * * * *